Figure 1:
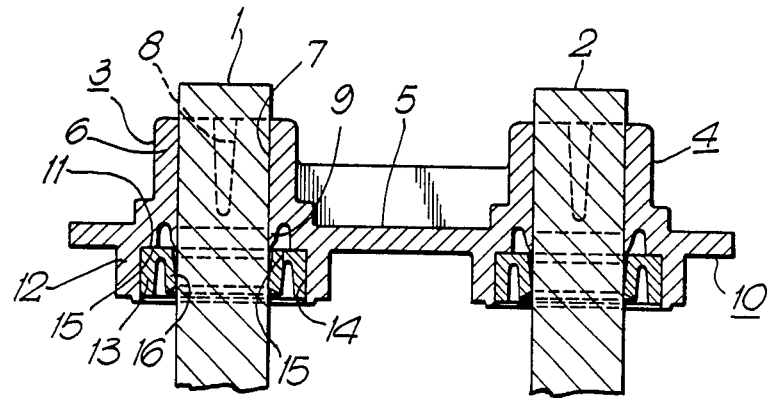

United States Patent [19]

Damji

[11] Patent Number: 4,795,276

[45] Date of Patent: Jan. 3, 1989

[54] SEALED BEARINGS

[75] Inventor: Dhirendra Damji, Biggleswade, England

[73] Assignee: Xerox Corporation, Stamford, Conn.

[21] Appl. No.: 151,144

[22] Filed: Feb. 1, 1988

[30] Foreign Application Priority Data

Mar. 27, 1987 [GB] United Kingdom ............... 8707382

[51] Int. Cl.[4] .............................................. F16C 33/74
[52] U.S. Cl. .................................................. 384/138
[58] Field of Search ............... 384/138, 147, 148, 151, 384/152, 153, 299, 300

[56] References Cited

U.S. PATENT DOCUMENTS 2,981,573  4/1961  Reuter ................................. 384/138
3,320,007  5/1967  Tennies et al. ..................... 384/147
3,330,605  7/1967  Jasmand .............................. 384/138
4,660,996  4/1987  Marshall ............................. 384/138

*Primary Examiner*—Lenard A. Footland

[57] ABSTRACT

A sealed bearing assembly for a rotating shaft includes a bearing member having an integral lip which engages the shaft to form a first seal. The bearing member also has an integral collar defining a recess into which is press-fitted a separate annular member adapted to engage the shaft so as to form a second seal closely adjacent the first seal. The two seals may have different sealing characteristics. The bearing member, the lip seal, and the collar are formed integrally as a one-piece element and can be manufactured simply and cheaply from a plastics material by injection molding.

11 Claims, 1 Drawing Sheet

U.S. Patent     Jan. 3, 1989     4,795,276

SEALED BEARINGS

This invention relates to a sealed bearing assembly for a rotating shaft.

BACKGROUND OF THE INVENTION

Sealed bearings are well known in the art for preventing foreign matter such as dust or contaminants from entering between the bearing surface and the shaft which would impair rotary efficiency and shorten the life of the bearing. Sealed bearings may also be used when a lubricant is present to prevent it escaping from the bearing, or in a container to prevent the contents spilling out.

U.S. Pat. No. 2,981,573 discloses a bearing assembly having a plastic bearing member comprising a lip seal formed integrally therewith. U.S. Pat. No. 2,859,071 to Riehl et al has what may be a lip seal biased against a shaft inside a main seal, but not integrally formed therewith. U.S. Pat. No. 4,574,212 to Haijkens teaches a bearing unit where the bearing itself is an insert, having a tapered portion formed thereon to act as a seal.

A problem may arise when such a sealed bearing arrangement is required to seal against material which falls into two distinct ranges of permeability. For example in a xerographic copying machine developer material is recirculated using a rotating auger in the developer sump. The auger comprises a shaft which has to be journaled in a bearing sealed to prevent the developer from entering the bearing. The developer, however, comprises two main constituents, namely toner and carrier material which fall into two distinct ranges of permeability because of the different particle sizes. Typically, toner particles are in the range of 4 to 18 $\mu$m whereas developer particles are in the range 212 to 355 $\mu$m. While a single seal of the type disclosed in the aforementioned U.S. patent may be effective in sealing against one or other of the particle types, it is unlikely to be effective in sealing against both since the more aggressive, coarser particles will tend to wear away the integral seal.

SUMMARY OF THE INVENTION

According to the present invention there is provided a sealed bearing assembly for a rotating shaft, comprising a bearing member having formed integrally therewith a lip adapted to engage the shaft so as to form first seal, characterized in that the bearing member has an integral collar defining a recess into which is fitted an annular member adapted to engage the shaft so as to form a second seal adjacent said first seal.

A bearing assembly in accordance with the invention has the advantage that the bearing member, the lip seal and the collar are formed integrally as a one-piece unitary element, and can be manufactured simply and cheaply, for example from a plastics material, particularly by injection molding. Insertion of the annular member is very straight forward and is ideally suited to fully-automated assembly using robots. Moreover the shaft can be assembled in the same mode as the annular member is inserted into the bearing member.

Furthermore, this bearing assembly also has the advantage of providing two seals in series and in close proximity and is therefore eminently suited to the xerographic developer environment discussed above or other situations where differential sealing may be desirable.

Another important advantage is that this bearing assembly is compatible with a wide variety of shaft materials encompassing, for example, mild stainless steel to non-ferrous and thermoplastic materials since it can accommodate various thermal expansion coefficients.

The bearing assembly may be intended simply for a single rotary shaft or alternatively for two or more shafts in which case several bearing members may be formed integrally as part of the same one-piece unitary element. In this way the number of component parts is kept to an absolute minimum and manufacture and assembly is simplified.

Figure 2:
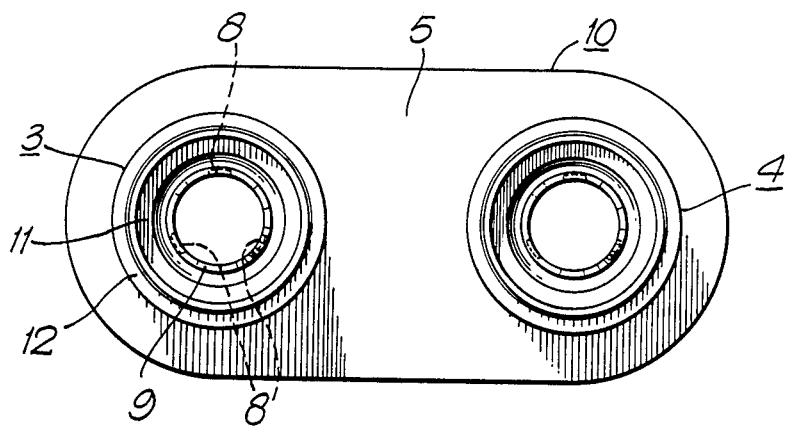

An embodiment of the invention will now be described, by way of example, with reference to the accompanying drawing, in which:

FIG. 1 is a cross section of a sealed bearing assembly comprising a twin bearing unit, in accordance with the invention, and FIG. 2 is a plan view from below of the twin bearing unit in FIG. 1.

The bearing assembly illustrated in the Figures comprises a twin bearing unit 10 supporting two rotatable shafts 1 and 2 mounted side by side in parallel relationship. The shafts may of course be arranged to be driven in the same sense or in opposite senses, depending on the particular application.

The twin bearing unit 10 comprises two individual bearing members 3 and 4 joined by a common portion 5 and is made in a single piece from a suitable plastics material by injection molding. As the bearing members 3 and 4 are identical only one of them will be described in detail hereinafter.

Bearing member 3 comprises a substantially cylindrical sleeve-like member 6 through which is journaled the shaft 1. The internal bearing surface 7 of sleeve member 6 is provided with three symmetrically disposed V-shaped grooves 8 which have a two-fold purpose: firstly, they act as vents to aid cooling of the mating surfaces during operation, and secondly, they provide a recess for any debris of foreign matter to collect without impeding the rotational efficiency. The grooves 8 have their flared ends extending up to the edge of the sleeve member 6 adjacent the end of the shaft 1 which promotes cooling and the symmetric V-shape enables debris to escape from the bearing when the shaft is rotated in either direction.

At the opposite edge the sleeve member 6 has an inwardly extending lip 9 formed integrally therewith. The lip 9 is a continuous extension of the bearing surface 7, but has a tapering bore and is formed with a tapering wall portion. The lip 9 engages the shaft 1 to form a seal preventing the entry of abrasive contaminants into the bearing surface.

Surrounding the lip 9 and integral with the sleeve member 6 is a flange 11 and a collar 12 which together provide a recess or seat 14 for a further seal 13. Seal 13 is in the form of an annular member having a substantially U-shaped cross section. The dimensions of seal 13 and its resilience are such that it can be press-fitted into seat 14 until the base portion 15 of the seal abuts flange 11. The inner wall 16 of seal 13 has a tapering bore and engages the shaft 1 to form a second seal closely adjacent the first seal.

In the present case, the twin shaft and bearing arrangement is intended for use in a developer sump of a xerographic copier where the shafts 1 and 2 are in fact augers for transporting the developer material and the shafts are driven in opposite senses so that the developer material is transported in opposite directions by the two augers. The opposite ends of the shafts 1 and 2 are suitably journaled in an identical bearing assembly. In this case the seal formed by the annular member 13 acts as a primary seal to prevent relatively course developer particles entering the bearing surfaces, whereas the seal formed by the lip seal 9 so that heat build-up and transfer is minimized. In this context it is noted that any rise in temperature in the sump is detrimental since it changes the electroxerographic properties of the developer contained therein resulting in the formation of undesirable toner and carrier agglomerates.

This double seal configuration is also effective in sealing for different heads of pressure, wherein primary seal 13 experiences and sustains the highest pressure as the pressure decays to atmospheric in moving across the section in FIG. 1 from the seal 13 to the end of shaft 1.

It is noted here that, for the sake of clarity, the shafts and the annular insert seals are omitted from FIG. 2 which simply shows the unitary bearing member 10.

In view of the foregoing description, it will be evident to a person skilled in the art that various modifications may be made within the scope of the present invention. Particularly, for example, it is not necessary to have a twin bearing member unit, the assembly may indeed comprise only a single bearing member if there is only one shaft to be supported. Alternatively, more than two bearing member may be incorporated in the same unit if there are more than two shafts to be driven. Furthermore, instead of a primary and secondary seal, the bearing unit may comprise a pair of secondary seals to assist in sieving and sealing at various pressure levels and coefficients of friction.

I claim:

1. A sealed bearing assembly for a rotating shaft, including:
    a bearing member having formed integrally therewith
        a lip adapted to engage the shaft so as to form a first seal, and
        an integral collar on the bearing member defining a recess into which is fitted an annular member adapted to engage the shaft so as to form a second seal adjacent said first seal.

2. A sealed bearing assembly as defined in claim 1, wherein the first and second seals have different sealing characteristics.

3. A sealed bearing assembly as defined in claim 1 wherein the annular member is adapted to be press fitted into the recess therefor.

4. A sealed bearing assembly as defined in claim 1 wherein the annular member has a substantially U-shaped cross section.

5. A sealed bearing assembly as defined in claim 4 wherein the closed base portion of the U-shaped annular member is disposed in abutting relationship with the flange of the bearing member.

6. A sealed bearing assembly as defined in claim 1, wherein the lip seal is surrounded by a flange formed integrally with the bearing member, said flange and collar together providing a seat for the annular member.

7. A sealed bearing assembly as defined in claim 6, wherein the closed base portion of the U-shaped annular member is disposed in abutting relationship with the flange of the bearing member.

8. A sealed bearing assembly as defined in claim 1 wherein the first seal is disposed closer than the second seal to the end of the shaft supported by said bearing member.

9. A sealed bearing assembly as defined in claim 1, wherein the surface of the bearing member against which the shaft bears is provided with at least one groove extending to the edge of the bearing member adjacent the end of the shaft.

10. A sealed bearing assembly as defined in claim 9, wherein the groove is substantially V-shaped having is flared end at the edge of the bearing member adjacent the end of the shaft.

11. A sealed bearing assembly as defined in claim 1, comprising two bearing members each supporting a respective shaft, and each comprising a respective collar and lip seal, wherein said at least two bearing members are formed integrally as a one-piece unitary element.

* * * * *